United States Patent [19]

Dunn, Jr.

[11] 3,929,501

[45] Dec. 30, 1975

[54] NOVEL TITANIUM DIOXIDE COMPOSITION

[75] Inventor: Wendell E. Dunn, Jr., Sydney, Australia

[73] Assignee: Titanium Technology, N.V., Curacao, Netherlands Antilles

[22] Filed: June 4, 1973

[21] Appl. No.: 366,547

Related U.S. Application Data

[63] Continuation-in-part of Ser. Nos. 4,563, Jan. 21, 1970, abandoned, and Ser. No. 138,460, July 12, 1971, abandoned.

[52] U.S. Cl. .............. 106/300; 423/610; 423/613; 106/304
[51] Int. Cl.² ........................................ C09C 1/36
[58] Field of Search ............ 106/300; 423/610, 613, 423/74

[56] References Cited
UNITED STATES PATENTS

| | | | |
|---|---|---|---|
| 2,184,884 | 12/1939 | Muskat et al. | 423/75 |
| 2,933,373 | 4/1960 | Love et al. | 423/74 |
| 3,457,037 | 7/1969 | Aramendia et al. | 423/86 |

*Primary Examiner*—Winston A. Douglas
*Assistant Examiner*—J. V. Howard

[57] ABSTRACT

Claimed is a novel titanium dioxide composition having 95.0 to 99.5%, by weight, of titanium dioxide, no more than 1.0%, by weight, of iron oxides, a bulk density in the range of 1.73 to 2.4 g./cc., a hardness (VHN) of 337-650, and a porosity of 0.03 to 0.08 cc./g. produced by passing chlorine through a deep bed of titaniferous ore-carbon mixture containing about 25%, by weight, of carbon at a temperature of about 900° to 1100°C.

The product is particularly useful as a raw material for producing titanium dioxide pigment but is also useful as a white pigment as such.

18 Claims, 6 Drawing Figures

NOVEL TITANIUM DIOXIDE COMPOSITION

CROSS REFERENCE TO RELATED APPLICATION AND DISCLOSURE DOCUMENTS

This application is a continuation-in-part of my earlier U.S. Pat. applications, Ser. No. 4,563 filed Jan. 21, 1970, now abandoned, and Ser. No. 138,460, filed July 12, 1971 now abandoned. The invention is described in U.S. Disclosure Document No. 002116 filed May 18, 1970.

FIELD OF THE INVENTION

This invention relates to a novel titanium dioxide composition obtained by beneficiating titaniferrous ores and is superior to natural rutile in its properties as a starting material for the manufacture of titanium-dioxide pigments.

BACKGROUND OF THE INVENTION

In recent years deposits of naturally occurring rutile have been seriously depleted. Rutile has been a major starting material for the production of titanium dioxide pigments used in large quantities of paints, rubber and paper. Another potential source of titanium dioxide is titaniferous ores ($nTiO_2 mFe_xO_y$).

The beneficiation of titaniferous ores to materially increase the proportionate amount of titanium dioxide is wellknown in the art. To remove undesirable portions of the ores there have been employed aqueous and nonaqueous processes involving treating with acid and base leaching and also metallurgical slagging and finally by chlorination. Aramendia U.S. Pat. No. 3,457,037 teaches a leaching process using chlorine to remove the iron component from the ore. The titanium dioxide product produced by leaching processes has a lower density, greater porosity, and lower hardness than the product of this invention. The leached product is considerable more friable than the product of this invention which is intermediate in properties between the leached product and rutile.

Chlorination of titaniferrous ores has consisted of either converting the entire mass of the ore to a mixture of the volatile chlorides of titanium, iron and other metals and separating the components by distillation to produce an essentially pure titanium tetrachloride or preferentially chlorinating the iron oxide and other readily chlorinated metal oxides without chlorinating the titanium oxide components.

For example, Muskat et al., U.S. Pat. No. 2,184,884 teaches a leaching chlorination process wherein the amount of iron and titanium removed is controlled by the amount of reducing agent, such as carbon, mixed wtih ore. The Muskat process minimizes the production of titanium by using 1 to 20 percent, by weight, of carbon and, preferably, 3 to 16%. My product is produced using large amounts of carbon and by passing chlorine through a deep bed of the carbon-ore mixture to produce titanium tetrachloride which reacts with the iron oxide within the ore particles to replace the iron oxide with titanium dioxide and forming iron chloride. Rather than being a leached product, my product is a "replacement" product.

However, until my present invention, chlorination produced either a beneficiated product of the leached variety having a high iron content because chlorination was stopped when titanium values began to be lost or as chlorination was continued in such processes to make a product having a low iron content a significant loss of titanium values occurred. Continued chlorination yields the leached titanium dioxide product which is not desirable because it is soft and tends to form fines which leads to the loss of titanium values in subsequent processing as well.

Because of its physical strength and chemical purity rutile is preferably used as a starting material for the production of titanium dioxide pigment by chlorination to titanium tetrachloride and then oxidation to the final pigment form of titanium dioxide.

Rutile, however, has the disadvantage that chlorination is many times slower and more difficult than with presently known beneficiated ores.

I have discovered a novel titanium dioxide composition of matter which is a preferred starting material for the production of titanium dioxide pigments. My product has a greater purity, bulk density and hardness than beneficiated ores produced in prior known methods of beneficiating titaniferrous ores.

For use as the raw material in fluidized bed chlorinators the new composition of matter, which is the subject of this invention, is preferable to leached beneficiates because the lower porosity and larger pores reduce friability and dusting losses. The high surface areas developed in leached beneficiates are avoided thereby reducing adsorbed water in the particles. Absorbed water has the disadvantage that it causes loss of chlorine in the fluidized bed chlorinator process by converting chlorine to hydrochloric acid. The chlorination rate of the new composition of matter lies between natural rutile and leached beneficiates and is sufficiently high so that the benefits of decreased bed depth and increased $CO_2/CO$ ratios in the fluidized bed chlorinated can be obtained. The chlorination rates are shown in FIG. (1).

SUMMARY OF THE INVENTION

The invention is directed to a novel titanium dioxide composition of matter comprising 95.0 to 99.5 per cent, by weight, of titanium dioxide, up to 1.0 percent, by weight, of iron oxides and readily chlorinated metal oxides, and the remainder silicates and other oxides which are difficult to chlorinate. This new composition of matter has a bulk density in the range of 1.73 to 2.4 grams per cubic centimeter, a hardness (VHN) of 337-650, and a porosity of 0.03 to 0.08 cc./g. The product is useful to make titanium dioxide pigment.

A process for producing the composition of this invention comprises the steps of passing chlorine through a fluidized bed 2 feet in depth having a 5.5 feet diameter (23.8 square feet in area) of a mixture of titaniferrous ore containing 10 to 30%, by weight, of carbon at a temperature of 900° to 1100°C at a rate of 0.5 feet per second using 60 SCFM of chlorine with air and nitrogen to maintain velocity and temperature. Fluidization of the bed occurs and the chlorine is totally consumed within the bed while iron chlorides and predominately ferrous chlorides and other metal chlorides are produced. These chlorides are continuously withdrawn from the reactor in gaseous state. After a period of time of about 20 to 30 minutes or longer or until the "tickle" point which is the point where the $TiCl_4$ is lost from the bed, the iron oxide concentration in the product is about 2 to 10%, by weight. The iron content is further reduced by contacting the bed alternately with a reducing agent such as carbon monoxide and then with chlorine until the iron oxide content of the product is 1.0 percent or less, by weight, as described in my copending patent application, Ser. No. 21,686, filed Mar. 23, 1970. The product can be further refined after cooling in a reducing atmosphere by tabling to remove unreacted carbon and by passing it through a magnetic separation to remove individual particles containing significant amounts of iron oxide.

Alternatively, the product can be made by a recycle process wherein the partially beneficiated ore and carbon is continuously added to a fluidized reactor operating between 900° and 1100°C and chlorine is passed through the ore mixture while the bed overflows at a rate equal to the quantity of ore added to the reactor and cooled under reducing condition. The cool ore is passed through a magnetic separator to separate a titanium dioxide product having up to 1.0%, by weight, iron oxide. Any partially beneficiated ore having more than 1.0%, by weight, of iron oxide is recycled to the reactor with make-up ore. This alternative process is described more fully in my copending U.S. Application for letters patent, Ser. No. 4,563, filed Jan. 21, 1970.

DESCRIPTION OF THE INVENTION

Figure 1:
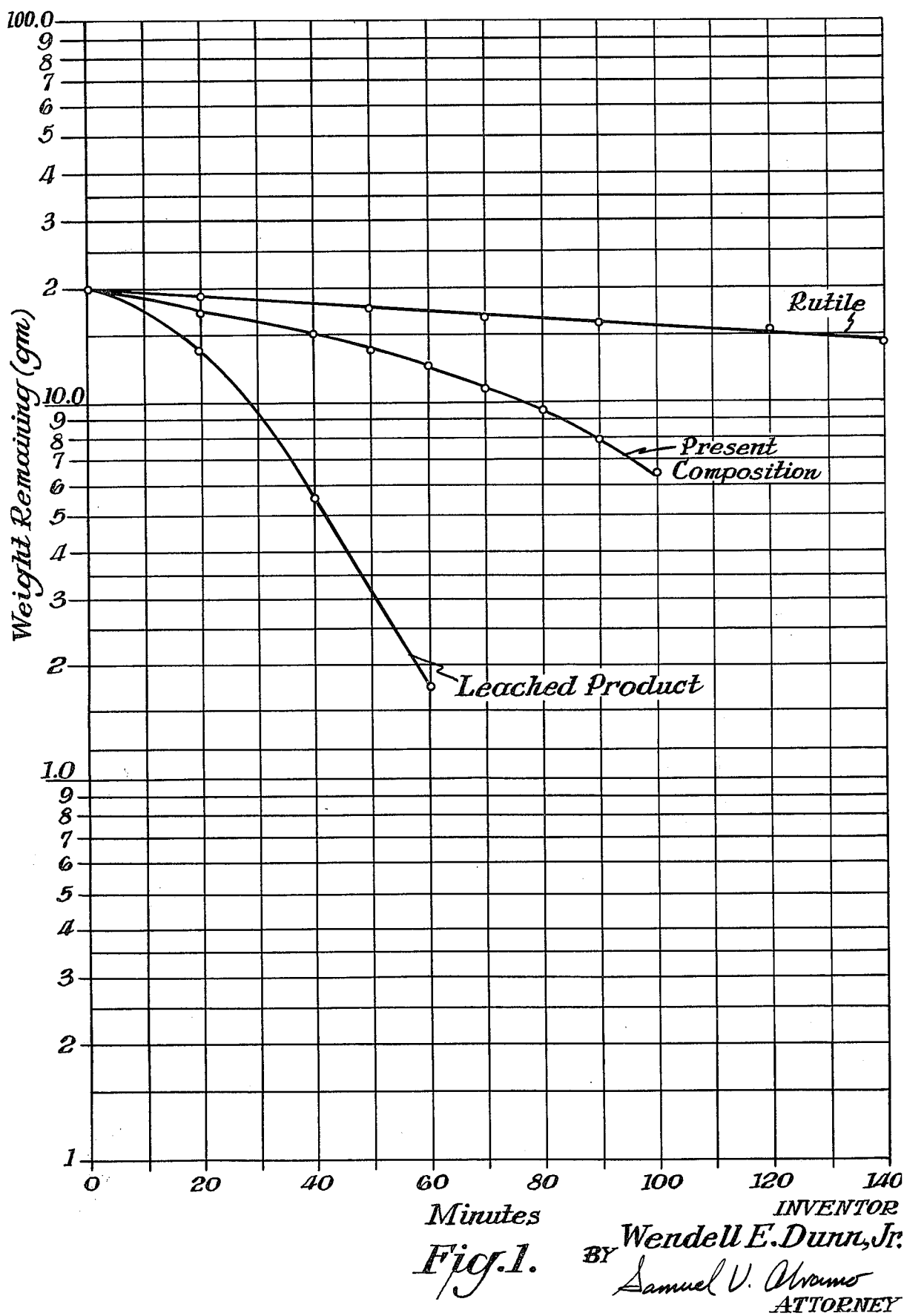
FIG. 1 is a plot of chlorination rate of naturally occurring rutile, the present product of this invention and leached product produced by beneficiation of titaniferous ores by a prior art leaching-type process. The weight of product remaining is shown in grams as a function of time of chlorination in minutes.
Figure 2:
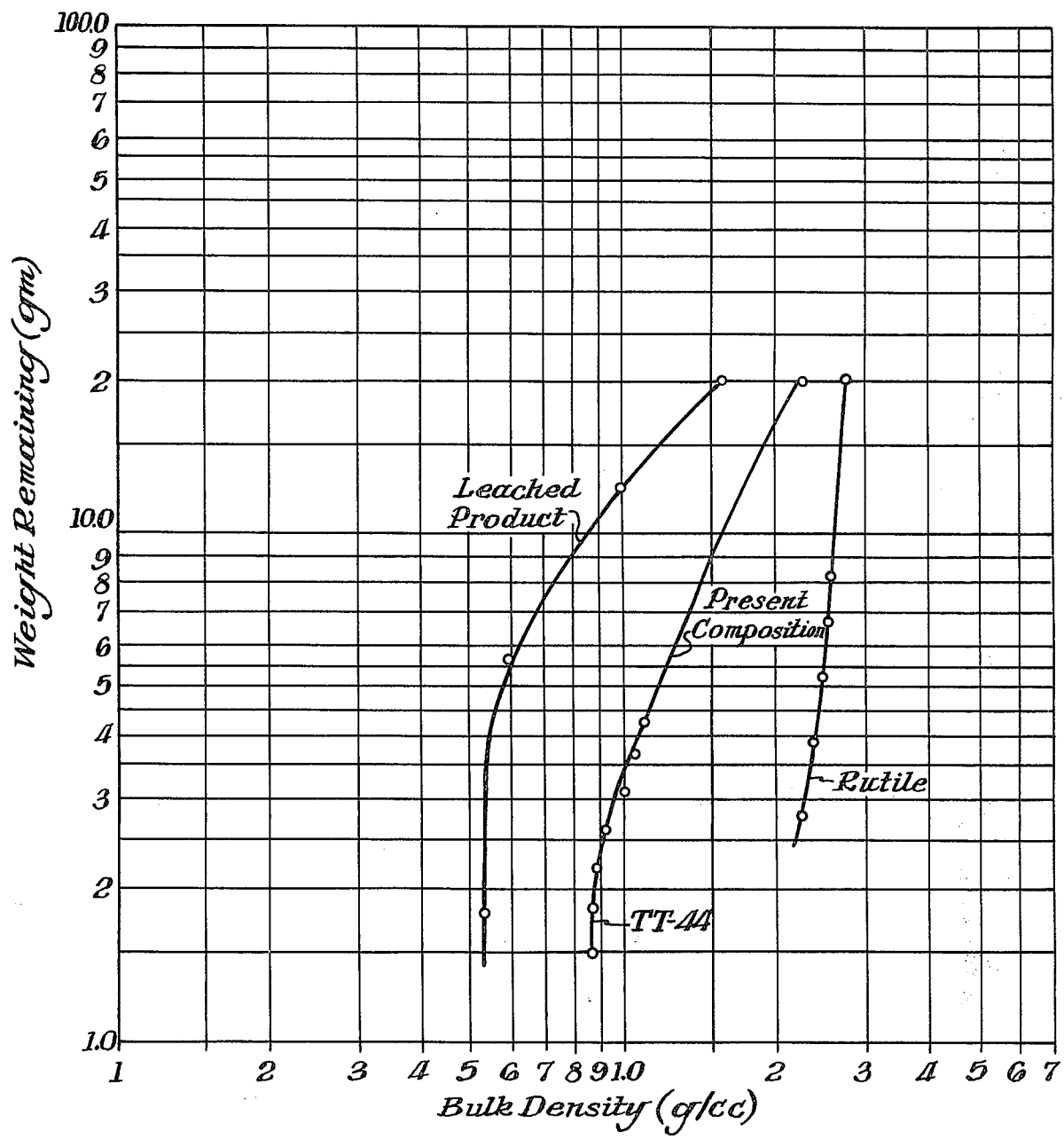
FIG. 2 is a plot of the rate of change in the bulk density upon chlorination of naturally occurring rutile, the present product of this invention (run TT-4) and leached producted by beneficiation of titaniferous ore by a prior art leachingtype process. The change in bulk density (gram per cubic centimeter) is shown for the grams of these substances remaining upon chlorination.

Although I do not wish to be bound by theory, I believe that the greater density and hardness of my composition results from titanium tetrachloride being produced in the reactor bed and then reacting with iron oxide in the ilmenite crystal lattice. It is economically and technically desirable to make titanium tetrachloride in the bed and the high carbon content increases the chlorine conversion to titanium tetrachloride so that it is the titanium tetrachloride and not the chlorine which carries out the conversion of iron oxides to iron chlorides and deposits titanium dioxide molecules in the particles. It is also necessary to have reducing conditions in the bed and I therefore provide an excess of carbon in the reactor to maintain reducing conditions at all times.

It is believed that the overall reaction in the bed is reaction (a) while others occurring during the process are (b), (c) and (d) as follows:

½ C + FeO.TiO$_2$ + Cl$_2$ = FeCl$_2$ + TiO$_2$ + ½CO$_2$    (a) 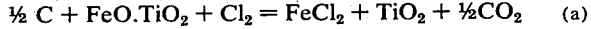

TiO$_2$ + 2Cl$_2$ + 2C = TiCl$_4$ + CO and CO$_2$ in a ratio of about 9:1 at 1000°C    (b) 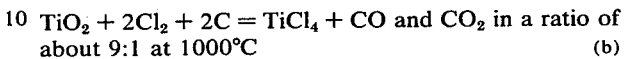

TiCl$_4$ + 2FeO.TiO$_2$ = 2FeCl$_2$ + TiO$_2$.2TiO$_2$    (c) 

¾ TiCl$_4$ + FeO$_{1.5}$.TiO$_2$ = FeCl$_3$ + ¾ TiO$_2$.TiO$_2$    (d) 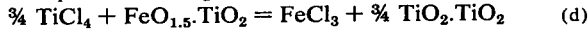

The process equipment used can be a conventional fluidized chlorinator. The carbonaceous material should preferably be a low chlorine consuming carbon such as charcoal, petroleum coke and the like. The titaniferous ore used has a particle size of about 50 to 150 mesh and can have a composition of 40% iron oxide and 54% titanium dioxide. In addition to these components and depending on the source ilmenite contains varying amounts of silica and silicates which are difficult to chlorinate and chromium, manganese, and vanadium oxides which are more readily chlorinated.

By-product metal chlorides consist predominantly of ferrous chloride and small amounts of ferric chloride, manganese chloride, chromium chloride and chlorides of other metals. The by-products stream also contains carbon monoxide, carbon dioxide, nitrogen and a small amount of titanium tetrachloride.

A typical leached product produced by aqueous acid leaching of a reduced ilmenite has the properties shown in

TABLE I

|  | A Leached Product | B CO+Cl$_2$ | C CO+Cl$_2$ | D Rutile | E Present Composition |
|---|---|---|---|---|---|
| TiO$_2$% | 95.55 | 9.2 | 95.2 |  | 95–99.5 |
| Fe% | 1.43 | 1.7 | 0.02 |  | <1.0 |
| Bulk Density g/cc | 1.4 | 1.4 | 1.16 | 2.84 | 1.73.–2.4 |
| Hardness (VHN) | 116 | 199 | 175 | 995 | 337–650 |
| Porosity (g/cc) | 0.17 |  |  |  | 0.03–075 |

Column A of Table I when determined as described above.

Chlorination methods normally involve reacting the ore with chlorine and carbon monoxide. When the amount of iron oxide remaining in the particles is reduced to 2 to 10%, by weight, in these processes, titanium values begin to be lost in the form of volatile titanium tetrachloride. A product of this method is shown in Table I, Col. B. Continued chlorination will further reduce the iron content but the product will be and remain soft and friable because of the loss of titanium from the particles. Such a product has the properties shown in Table I, Col. C. The properties of natural rutile and the properties of the new composition are shown in Column D and E respectively.

In my composition of matter, the particles are essentially solid titanium dioxide and have properties of density, hardness, porosity and chlorination rate intermediate between those of rutile and prior art products.

The hardness expressed in Table I is the Vickers hardness number (VHN) as determined on a Vickers low-load micro-indentation hardness tester as described by Zussman, Physical Methods in Determinative Mineralogy, Academic Press, London and New York, 1967, pp. 131–150

Bulk density was determined by weight and volume measurement. Porosity was measured by a mercury porosimeter in the pore diameter range of between 0.2 microns and 20 microns.

Chlorination rate was tested using 20 gm. of the beneficiate or natural rutile in a fluidized bed attacked by a 50% CO and $Cl_2$ mixture at 26 mmols/min each at a temperature of 1,000°C. The results are shown in FIG. I.

To examine the phenomenon of fluidized bed abrasion of various raw materials under chlorination conditions a test was employed involving reacting 20 gm. of raw material at 1000°C with 26 mols/min of CO and $Cl_2$. The results from a series of weight measurements at increasing intervals of time vs. bulk density are plotted on log-log scale as shown in FIG. II. A material which maintains its geometry by loss from the surface will lose volume and weight in a constant ratio, the density will remain constant. When the material chlorinates internally its volume remains constant, its weight decreases and the slope of the weight remaining vs. density curve will be 45°. Materials which chlorinate partially topochemically and partially internally will lie between these cases. When a material is weakened to the point of total disintegration or surface disintegration the curve of weight remaining vs. density will drop vertically. From this it is clear what dust losses can be expected from various materials.

Figure 3A:
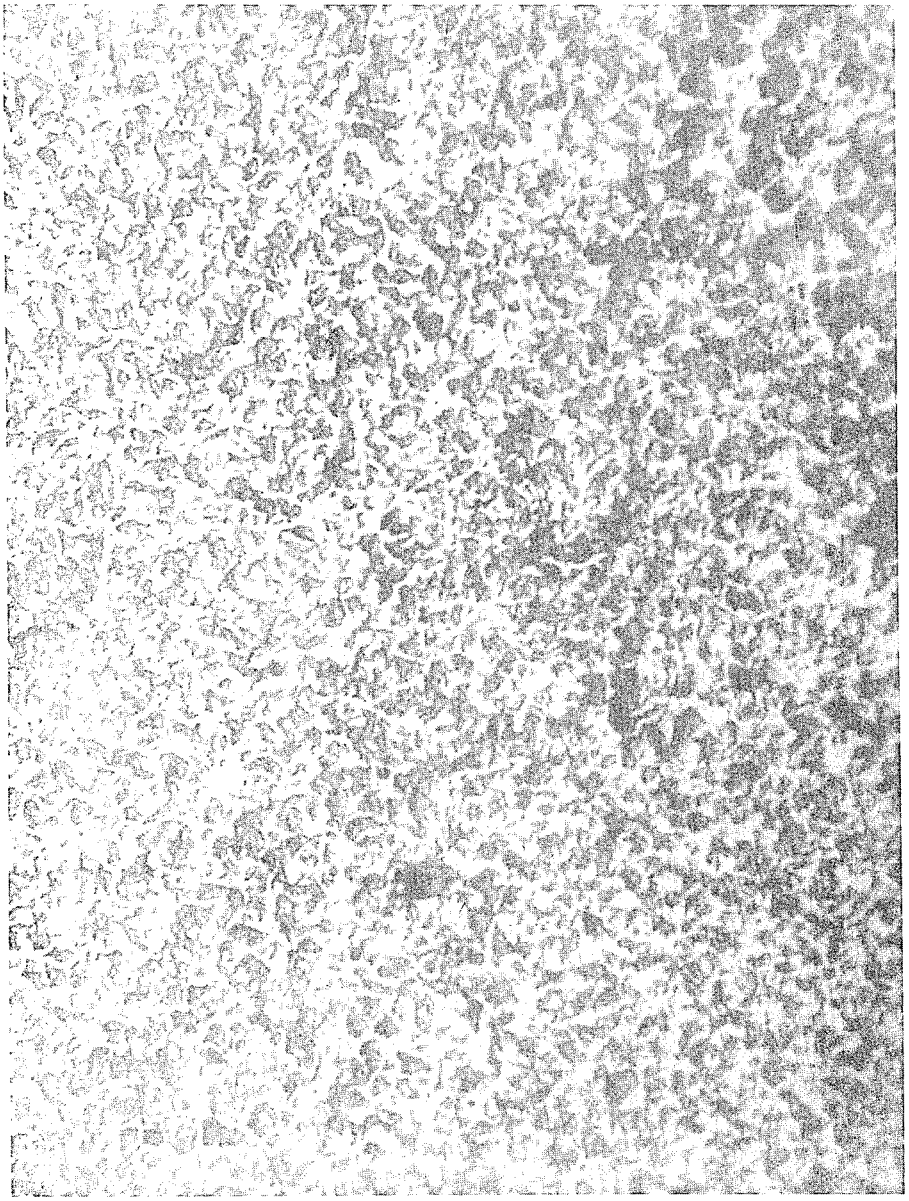
FIG. 3A is a photomicrograph at 2,000 times magnification of beneficiated titaniferous ore produced by a leaching process.
Figure 3B:
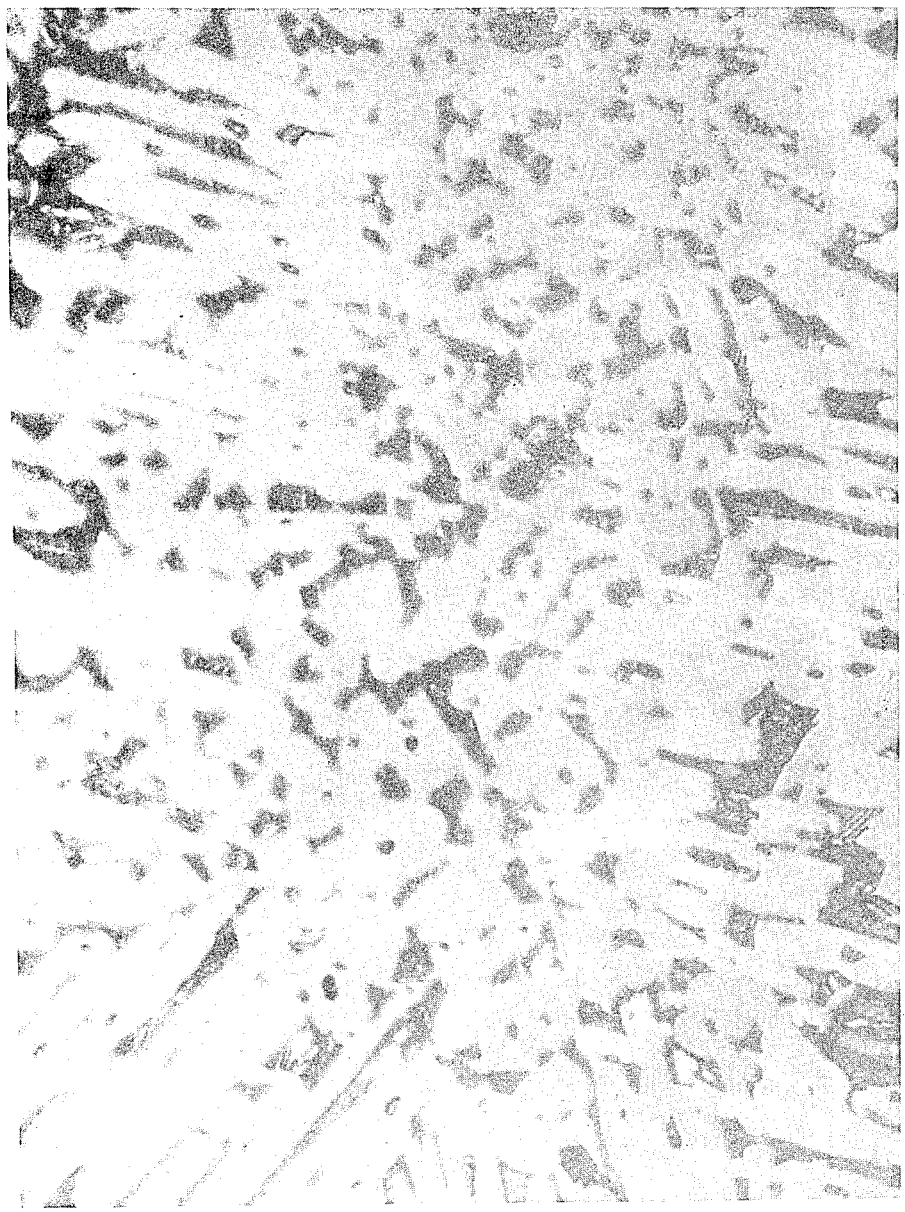
FIG. 3B is a photomicrograph at 2,000 times magnification of the novel beneficiated titaniferous ore of this invention.
Figure 4A:
FIG. 4A is a photomicrograph of the surface of a rutile particle at 500 times magnification.
Figure 4B:
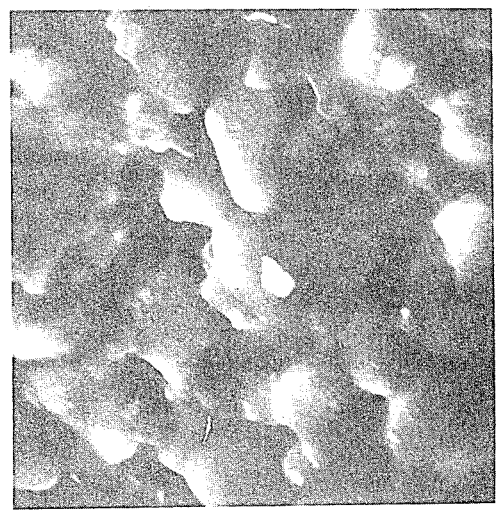
FIG. 4B is a photomicrograph of a particle of the product of this invention.

FIGS. 3A and 3B show two photomicrographs of beneficiated products taken under a microscope at 2000 magnification. Photomicrograph 3A is of sample A which is leached titanium dioxide and photomicrograph 3B is of sample B the composition of matter which is the subject of this invention. In photomicrograph 3A it can be seen that there are a multitude of fine pores while in photomicrograph 3B there are far fewer pores and the pores are larger. This clearly shows the difference resulting when titanium redeposition is employed. FIGS. 4A and 4B show two samples viewed by a scanning electron micrograph at 5,000 magnification. By comparison of FIG. 4A of natural rutile it is known that rutule is very dense with little porosity, whereas FIG. 4B shows clear evidence of grain growth resulting from the redeposition of titanium dioxide.

The properties of my novel composition unexpectedly possessed beneficial qualities. My product can be converted into titanium tetrachloride with a minimum production of fines, i.e., small particles of titanium dioxide which are too light to be retained in the chlorination reactor used to form titanium tetrachloride, compared to the use of leached beneficiated titaniferous ore. The production of fines results in the loss of titanium values. It is also more convenient to use my product compared to rutile since it has a greater chlorination rate than rutile.

The greater hardness and strength of my composition operate to minimize the loss of titanium values because there will be less fines created in the further chlorination reaction to form titanium tetrachloride. My composition has a greater rate of chlorination than rutile. This permits utilization of lower bed depths and therefore has the advantage of smaller carbon consumption with less carbon. monoxide production for safer and more economical processing in the making of titanium tetrachloride.

The following illustrates a process for making the invention. Temperatures are expressed in degrees Centigrade and percentages are by weight unless otherwise indicated.

EXAMPLE 1

The composition of matter of this invention was prepared in a cylindrical flat bottomed brick bed reactor having a brick lining 9 inches thick with an internal diameter of 5.5 feet. The reactor was equipped with a stainless steel outlet pipe for by product gases on its top and an inlet tube on its side wall for feeding solid reactants to the reactor about 2 feet from its bottom and a 2 foot overflow weir for removing a portion of the solid reactants. The bottom of the fluidized reactor was equipped with a gas distributor which had openings on 1½ inches centres. A mixture of a Murphy-ores ilmenite and 25%, by weight, of petroleum coke was added to the reactor. The titaniferous ore had a mean diameter size of 80 microns and was analysed as 54.1% $TiO_2$, by weight, 21.0% FeO, 21.0% $Fe_2O_3$, 1.51% MnO and the remainder was predominently silicates. When sufficient ore-coke mixture was brought to 1,000°, a mixture of chlorine and air was passed through the fluidized bed at a rate of 60 standard cubic feed per minute (SCFM), occasionally it was necessary to dilute the chlorine with air and oxygen or with nitrogen to maintain the temperature within the reactor at 1,000°C to convert iron oxide into volatile iron chlorides, mainly ferrous chloride with minor amounts of ferric chloride which were removed from the reactor through a stainless steel outlet pipe along with nitrogen, HCl and other gases.

After an amount of chlorine sufficient to completely convert the iron oxide in the ore to ferrous chloride was added, titanium tetrachloride fumes were noted in large volume in the exit gases. The reactor and its contents were then cooled under reducing conditions in the presence of propane and the contents screened to remove unreacted carbon. The rest of the contents were passed through a magnetic separator into a first fraction having an iron content of 1.0% or less, by weight, of iron oxide and a second fraction having an iron content of 1.0% or more iron oxide.

The product comprising the first fraction was cream in color and had the following properties:

| | |
|---|---|
| $TiO_2$% | 96.5 |
| Fe% | 0.17 |
| Bulk Density g/cc | 1.73 |
| Hardness | 337 |
| Porosity | 0.08 |

The properties of the titanium dioxide product are dependent somewhat on the original titaniferous ore. Nevertheless, the most preferred product of this invention has a titanium dioxide content of at least 95%, by weight, an iron content of up to 1.0%, a bulk density of 2.0 to 2.4, a VHN hardness of 450 to 650, and a porosity of 0.03 to 0.05 cc/g. A preferred product has a titanium dioxide content of at least 95%, by weight, an iron content of up to 1.0%, a bulk, density of 1.9 to 2.4, a VHN hardness of 400 to 650, and a porosity of 0.03 to 0.06 cc./g. Another preferred product has a titanium dioxide content of at least 95%, by weight, an iron content of up to 1.0%, a bulk density of 1.8 to 2.4, a VHN hardness of 375 to 650, and a porosity of 0.03 to 0.07 cc./g.

EXAMPLE 2

100 lbs of ilmenite and sufficient quantity of charcoal were introduced and heated in the chlorinator. The chlorinator was a conventional fluidized bed reactor of 1.4 ft. internal diameter, with a stainless steel shell lined with refractory bricks, equipped with an inlet pipe for solids at the side, a distributor for inlet gases at the bottom and a conical roof lined with kaowool, fitted with a pipe for exit gases. The bed was fluidized by 9 scfm of air. When the temperature reached 900°C, 25 lbs. Great Lake Petroleum Coke was introduced. Air was shut off at 1,000°C and chlorine was fed at 9 scfm. From time to time small quantities of oxygen was also fed by reducing chlorine flow to maintain total flow at 9 scfm for the purpose of heat balance. Exit gases containing iron chlorides, $CO_2$ and small quantities of CO and $TiCl_4$ were scrubbed by caustic in a downstream scrubber. Chlorine was switched off when the exit effluent from the caustic scrubber turned thick white indicating $TiCl_4$ breaking through the bed. 2 scfm $N_2$ was then fed, while the bed was being reduced by carbon in the bed for 10 minutes, then 1 scfm $Cl_2$ and 8 scfm $N_2$ were fed until $TiCl_4$ was again observed in the exit effluent. The alternating reduction and chlorination steps were carried out five times. In each chlorination step, chlorine was stopped when $TiCl_4$ was observed; the chlorination therefore varied from 5 minutes to 1 minute progressively. The bed was then cooled, magnetically separated, and wet-tabled. A product of the following properties was obtained:

| | |
|---|---|
| $TiO_2$% | 96.5 |
| Fe% | 0.17 |
| Bulk Density | 1.73 g/cc |
| VHN hardness | 435 |
| Porosity | 0.075 cc./g. |

The composition of this invention is directly useful as a filler for rubber and paper when the composition is subjected to a grinding step to reduce the particle size. For example, 1.0 to 10 percent, by weight, of the product can first be ball-milled and then mixed with unvulcanized rubber on a rubber mill. The filled unvulcanized rubber is then mixed with appropriate accelerators and compressed at elevated temperatures in a mold to produce a tough, light colored rubber product.

As hereinbefore described, the composition of this invention is a preferred material for the production of titanium tetrachloride which is useful for the production of titanium dioxide pigments or titanium metal.

The foregoing detailed descriptionn has been given for clarity of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A novel titanium dioxide comprising 95.0 to 99.5 percent, by weight, of titanium dioxide, up to 1.0 percent, by weight of a combination iron oxide and readily chlorinated metal oxides and the remainder silicates and other difficultly chlorinated oxides, said composition of matter having a bulk density in the range of 1.73 to 2.4 grams per cubic centimeter, a hardness (VHN) of 337–650 and a porosity of 0.03 to 0.08 cc/g.

2. The composition of claim 1 having a bulk density of 1.8 to 2.4 grams per cubic centimeter.

3. The composition of claim 1 having a bulk density of 2.0 to 2.4 grams per cubic centimeter.

4. The composition of claim 1 having up to 0.5 percent, by weight, of a combination of iron oxide and readily chlorinated metal oxides.

5. The composition of claim 1 having up to 0.25 percent, by weight, of a combination of iron oxide and readily chlorinated metal oxides.

6. The composition of claim 1 having up to 0.15 percent, by weight, of a combination of iron oxide and readily chlorinated metal oxides.

7. The composition of claim 1 having 97.0 to 99.5 percent, by weight, of titanium dioxide.

8. The composition of claim 7 having 0 to 0.5 percent, by weight, of a combination of iron oxide and readily chlorinated metal oxides.

9. The composition of claim 7 having 0 to 0.25 percent, by weight, of a combination of iron oxide and readily chlorinated metal oxides.

10. The composition of claim 7 having 0 to 0.15 percent, by weight, of a combination of iron oxide and readily chlorinated metal oxides.

11. The composition of claim 1 having 98 to 99.5 percent, by weight, titanium dioxide.

12. The composition of claim 11 having 0 to 0.5 percent, by weight, of a combination of iron oxide and readily chlorinated metal oxides.

13. The composition of claim 11 having 0 to 0.25 percent, by weight, of a combination of iron oxide and readily chlorinated metal oxides.

14. The composition of claim 11 having 0 to 0.15 percent, by weight, of a combination of iron oxide and readily chlorinated metal oxides.

15. The composition of claim 1 having 96.5 percent, by weight, of titanium dioxide, 0.17 percent, by weight, of iron oxide and other readily chlorinated metal oxides, the remainder of silicates and other difficultly chlorinated oxides said composition having a bulk density of 1.73, a VHN hardness of 435 and a porosity of 0.075 cc/g.

16. The composition of claim 2 having a VHN hardness of 375 to 650, and a porosity of 0.03 to 0.07 cc/g.

17. The composition of claim 3 having a VHN hardness of 450 to 650 and a porosity of 0.03 to 0.05 cc/g.

18. The composition of claim 1 having a bulk density of 1.9 to 2.4, a VHN hardness of 400 to 650, and a porosity of 0.03 to 0.06 cc/g.

* * * * *